United States Patent
Otto et al.

(10) Patent No.: US 10,267,358 B2
(45) Date of Patent: Apr. 23, 2019

(54) DRILL DRIVE FOR A DRILLING RIG

(71) Applicant: BAUER-Pileco Inc., Conroe, TX (US)

(72) Inventors: Hans-Philipp Otto, Aichach (DE); Sebastian Soier, Schrobenhausen (DE)

(73) Assignee: BAUER Equipment America, Inc., Conroe, TX (US)

( * ) Notice: Subject to any disclaimer, the term of this patent is extended or adjusted under 35 U.S.C. 154(b) by 333 days.

(21) Appl. No.: 15/173,929

(22) Filed: Jun. 6, 2016

(65) Prior Publication Data

US 2017/0350446 A1 Dec. 7, 2017

(51) Int. Cl.
| | |
|---|---|
| *E21B 3/02* | (2006.01) |
| *E21B 44/00* | (2006.01) |
| *F16C 19/38* | (2006.01) |
| *E21B 4/00* | (2006.01) |
| *F16C 19/30* | (2006.01) |
| *F16C 19/52* | (2006.01) |
| *F16C 19/54* | (2006.01) |
| *F16C 19/36* | (2006.01) |

(52) U.S. Cl.
CPC ............ *F16C 19/381* (2013.01); *E21B 3/02* (2013.01); *E21B 4/003* (2013.01); *E21B 44/00* (2013.01); *F16C 19/30* (2013.01); *F16C 19/383* (2013.01); *F16C 19/522* (2013.01); *F16C 19/545* (2013.01); *F16C 19/364* (2013.01); *F16C 2233/00* (2013.01); *F16C 2352/00* (2013.01)

(58) Field of Classification Search
CPC .......... E21B 3/02; E21B 44/00; F16C 19/381; F16C 19/383; F16C 2233/00; F16C 2352/00
See application file for complete search history.

(56) References Cited

U.S. PATENT DOCUMENTS

| | | | | |
|---|---|---|---|---|
| 4,260,202 A | * | 4/1981 | Crase | E21B 4/003 175/371 |
| 5,269,383 A | * | 12/1993 | Forrest | E21B 4/02 175/106 |
| 7,770,668 B2 | * | 8/2010 | Kruse | E21B 19/084 175/170 |
| 2011/0299802 A1 | * | 12/2011 | West | F16C 27/045 384/107 |

(Continued)

FOREIGN PATENT DOCUMENTS

| | | | | |
|---|---|---|---|---|
| GB | 2354787 A | * | 4/2001 | ............... E21B 4/02 |
| WO | WO-2017211675 A1 | * | 12/2017 | |

*Primary Examiner* — Daniel P Stephenson
(74) *Attorney, Agent, or Firm* — Studebaker & Brackett PC

(57) ABSTRACT

A drill drive for a drilling rig includes a motor, by which a drive shaft is rotationally driven which is supported in a rotatable manner in a housing with a bearing arrangement having at least a radial bearing, a first axial bearing and a second axial bearing. On the first axial bearing a first force measuring device is arranged for determining a first axial force on the first axial bearing and on the second axial bearing a second force measuring device is arranged for determining a second axial force on the second axial bearing. A drilling rig, in particular for oil or gas drilling, with a drill mast, along which a drill string with a drilling tool is arranged, wherein on the drill mast a drill drive according to the invention is supported in a displaceable manner for rotationally driving the drill string.

5 Claims, 2 Drawing Sheets

(56) References Cited

U.S. PATENT DOCUMENTS

| | | | |
|---|---|---|---|
| 2012/0275159 A1* | 11/2012 | Fraze | G02B 6/32 |
| | | | 362/259 |
| 2013/0319764 A1* | 12/2013 | Schaaf | E21B 7/06 |
| | | | 175/24 |
| 2016/0084017 A1* | 3/2016 | Finke | E21B 17/03 |
| | | | 175/61 |
| 2017/0159360 A1* | 6/2017 | Netecke | E21B 3/02 |
| 2017/0314332 A1* | 11/2017 | Kirkhope | E21B 7/067 |
| 2017/0350446 A1* | 12/2017 | Otto | F16C 19/381 |
| 2018/0038413 A1* | 2/2018 | Aizawa | F16C 19/525 |
| 2018/0112465 A1* | 4/2018 | Ritchie | E21B 4/003 |

* cited by examiner

DRILL DRIVE FOR A DRILLING RIG

The invention relates to a drill drive for a drilling rig and to a drilling rig, in particular for oil or gas drilling.

BACKGROUND

Drill drives, used for oil and gas drilling operations in particular, usually have a drive shaft which drives a drill string. The drive shaft is supported by means of a bearing arrangement which serves to stabilize the drive shaft both in an axial position and in a radial position.

To take up and transmit the drive torque as well as the radial bending forces resulting from the drill string radial bearings can be provided. These can be cylindrical roller bearings and tapered roller bearings, the axial force component of which can counteract the additional axial bearing. To take up the forces of the drive shaft that act in the axial direction provision is usually made for axial bearings.

Due to the fact that in drilling for oil and gas the drilling progress as well as the wear of the drill head significantly depends on the load of the drill head, in addition to the abrasiveness of the ground material, it is essential for the operation of the drilling rig that the load on the drill head is known as precisely as possible. For this purpose, as is known, the drill head has e.g. sensors which measure the pressure imposed on the drill head and forward this via lines or other transmission means in the upward direction to the drillmaster. The transmission of the measured values from the drill head involves a considerable effort and is marked by additional sources of error.

Another possibility of measuring the load on the drill head is to install a load measuring cell below the rotary drive before the beginning of the drill string. Since the load measuring cell co-rotates with the drive shaft during operation it has to be equipped with an energy store in order to transmit the measured values to the drillmaster.

Furthermore, a contributory factor in the inaccuracy of the measurement are the prestressing forces prevailing in a bearing arrangement, through which the applied load exerted on the drive shaft deviates from the load on the drill head.

SUMMARY

The invention is therefore based on the object to provide a drill drive for a drilling rig which enables a particularly simple, yet precise determination of the actual load on the drill head and the drive shaft respectively.

The object is achieved on the one hand by a drill drive for a drilling rig and on the other hand by a drilling rig, in particular for oil and gas drilling. Preferred embodiments of the invention are stated in the respective dependent claims.

The drill drive for a drilling rig in accordance with the invention is characterized in that the drill drive has a motor, by which a drive shaft is rotationally driven which is supported in a rotatable manner in a housing with a bearing arrangement having at least a radial bearing, a first axial bearing and a second axial bearing, wherein on the first axial bearing a first force measuring device is arranged for determining a first axial force on the first axial bearing and on the second axial bearing a second force measuring device is arranged for determining a second axial force on the second axial bearing.

A first basic idea of the invention resides in the fact that provision is made for a drill drive with a bearing arrangement for a drive shaft of a drill string and/or drill head, which has force measuring devices in the region of individual bearings that are designed to determine a load of the shaft before and/or after the respective bearing.

A second basic idea of the invention is to determine, by means of the data ascertained by the force measuring devices, the forces actually acting on a drive shaft or the drilling device (e.g. drill head, drill string) below a bearing arrangement, in particular a load, i.e. to establish a deviation from an applied load exerted onto the drive shaft above the bearing arrangement.

A preferred embodiment of the invention resides in that the first axial bearing is designed as a tapered roller bearing that carries an axial main load of the drive shaft. The first axial bearing can in particular be designed to substantially take up a tensile load of the drive shaft during extraction and/or a load acting on the drive shaft during the production of a borehole. Basically, the drive shaft can be acted upon by a load both directly by way of a corresponding device which can be provided e.g. above the bearing arrangement and via the housing that surrounds the shaft, in particular containing the bearing arrangement. Due to the conical shape of the axial bearing this is able to take up an axial force component as well as a radial force component. Hence, by means of the first axial bearing the drive shaft can be guided both axially and radially.

According to a further embodiment of the invention it is especially expedient that the radial bearing is arranged at a lower end of the drill drive in the direction of a weight force acting on the drill drive and that the second axial bearing is arranged above the radial bearing in the direction of the weight force acting on the drill drive. The weight force, which is gravity-induced in particular, acts in the direction of the ground beneath. The radial bearing can in particular be provided at a lower end of the device, especially as a lower bearing of the bearing arrangement, wherein the radial bearing can especially be provided to take up a significant radial component of the force acting on the drive shaft and/or to guide the drive shaft radially. Thus, a radial movement, more particularly a lateral movement of the shaft inside the housing of the drill drive can be prevented. The second axial bearing can in particular be provided in an upper region, preferably as an upper bearing of the bearing arrangement.

According to a further embodiment of the invention it is especially advantageous if the radial bearing is designed as a cylindrical bearing and the second axial bearing as a tapered roller bearing. Basically, the radial bearing and also the other bearings provided can be designed as roller or plain bearings. Preferably, the second axial bearing is designed both with a radial component and with an axial component for taking up a radial force as well as an axial force of the drive shaft. If the second axial bearing is designed as a roller bearing the said second axial bearing can have along the axis of rotation of its respective bearing bodies at a first end of the bearing bodies a region with a smaller diameter which is directed towards the shaft. The opposite side of the respective bearing body, also referred to as rolling element, can have a second end with a larger diameter or a greater circumference. Thus, the bearing bodies can have a cylindrical shape, the wider end of which points away from the drive shaft along their axis of rotation in the outward direction. By particular preference, the axes of rotation of the bearing bodies of the second axial bearing are arranged with an inclination in relation to the axis of rotation of the drive shaft, wherein the second axial bearing can be designed to take up a radial force component of the drive shaft. If the second axial bearing is designed as a plain bearing the said plain bearing can have at least one first sliding surface, whose supporting surface for the drive shaft, together with the axis of rotation of the drive shaft, confines an angle that differs from a right angle. The explanations set out with regard to the second axial bearing are in principle also applicable to the first axial bearing.

An expedient further embodiment of the drill drive according to the invention resides in the fact that the radial bearing is designed as a non-locating bearing which is arranged in a movable manner parallel to an axis of rotation of the drive shaft. The radial bearing can be designed e.g. as a cylindrical bearing and have a bearing clearance. This bearing clearance can in particular enable a coaxial movement of the radial bearing bodies along a limited bearing guide, wherein the bearing guide can be designed parallel to the axis of rotation of the drive shaft. By preference, the radial bearing can be designed as a plain bearing, wherein the contact surface between the drive shaft and the radial bearing can basically permit a movement of the drive shaft in axial direction.

By particular preference, the bearing arrangement of the drill drive can be designed in such a manner that the first axial bearing is arranged between the radial bearing and the second axial bearing. The bearing arrangement according to the invention can be provided with axial bearings arranged directly on top of each other. According to requirement the radial bearing can also be provided at an upper end of the bearing arrangement, in particular above the second axial bearing, wherein the second axial bearing can be provided between the first axial bearing and the radial bearing. By particular preference, a radial bearing can in each case be provided both above the two axial bearings and below the two axial bearings.

To determine a load, more particularly a load on a drill head which can be provided at a lower end of the drive shaft, it may be expedient to arrange the first force measuring device below the first axial bearing and the second force measuring device above the second axial bearing. Thus, in the bearing arrangement the first and the second axial bearing can be provided between the force measuring devices. The drive shaft can in particular be provided with a prestressing between the two axial bearings.

Basically, in a bearing arrangement a positive or negative operating internal clearance can be set. In most applications a positive setting of the operating internal clearance may be of advantage, i.e. during operation a slight residual internal clearance is still provided in the bearing. For example for drilling rigs a negative operating internal clearance, i.e. a prestressing, may be required to improve the rigidity of the bearing arrangement or enhance the running accuracy.

The internal clearance is defined as the overall distance, by which a bearing ring can be moved relative to another bearing ring in radial direction (radial internal clearance) or in axial direction (axial internal clearance). The radial internal clearance of a bearing can be of particular importance for a satisfactory operation.

The bearing arrangement according to the invention can have at least two tapered roller bearings that are formed in different sizes and with different spring constants, wherein a prestressing force can be provided between the tapered roller bearings. If an axial force acts on a first of the two bearings the second bearing is relieved.

An expedient further embodiment of the drill drive according to the invention resides in that a computer unit is provided which is connected to the first force measuring device and the second force measuring device and designed to calculate an axial force that acts on the drive shaft below the bearing arrangement. Especially due to a spring module of the bearing arrangement or of the individual axial bearings a load present on the drive shaft above the bearing arrangement during drilling can deviate from the load that acts on the drive shaft or a drill head below the bearing arrangement.

According to a further embodiment of the invention it is particularly preferred that the force measuring devices are arranged in a fixed manner and the computer unit is designed to compensate a load above the bearing arrangement, which acts in the direction of the weight force and onto the drive shaft, compared to the applied load below the bearing arrangement which is actually present on the drive shaft, in particular on the drill head. In particular, the force measuring devices can be provided in a stationary manner on the bearing arrangement, preferably in the housing, wherein they remain unchanged in their position in the housing upon a rotational movement of the drive shaft. The force measuring devices can in particular be provided directly below a supporting surface of the first axial bearing and above a supporting surface of the second axial bearing, thus being designed as a static, non-rotating part of the bearing arrangement. Consequently, a difference of the axial forces on the drive shaft between a region above the axial bearing arrangement and a region below the axial bearing arrangement can be compensated by means of the computer unit.

According to a further embodiment of the invention it is especially preferred that the first force measuring device is arranged between the radial bearing and the first axial bearing. In this way, a stabilized region can be formed at least around the force measuring device below the first axial bearing, wherein the radial bearing can contribute to the compensation of vibrations caused by the shaft on the bearing housing, whereby a particularly precise measurement may be rendered possible.

For an especially precise determination of the load forces provision is preferably made in that on the drill drive at least one temperature sensor is arranged which is connected to the computer unit for determining a temperature-dependent bearing tensioning and designed to detect a temperature of the bearing arrangement. A temperature change in the bearing arrangement can promote an expansion of components of the bearing arrangement. The expansion of the bearing arrangement components can contribute to a change of the prestressing in the bearing arrangement, in particular in the drive shaft between the first axial bearing and the second axial bearing. Thus, the forces to be compensated that act on the drive shaft above and below the bearing arrangement can be subject to temperature-dependent changes. By determining the temperature of the bearing arrangement and/or of the drive shaft in the region of the bearing arrangement a temperature-dependent contribution to prestressing can be determined and taken into account in the compensation of the forces. This can allow for a particularly precise determination of the load that is actually effective at a lower end of the drive shaft or of the contact pressure of a drill head onto the ground. The temperature sensor can in particular be provided in a region of the bearing arrangement, preferably in a region directly above the force measuring device of the second axial bearing and/or directly below the first axial bearing.

The drilling rig according to the invention, in particular for oil and gas drilling, is characterized in that it has a drill mast, on which a drill string with a drilling tool is arranged, wherein on the drill mast a drill drive for rotationally driving the drill string is supported in a displaceable manner.

Another fundamental idea of the invention resides in the fact that a drilling rig with a drill drive according to the invention is provided which drives a drive shaft for a drill, in particular a drill string for oil and gas drilling.

DETAILED DESCRIPTION

Figure 1:
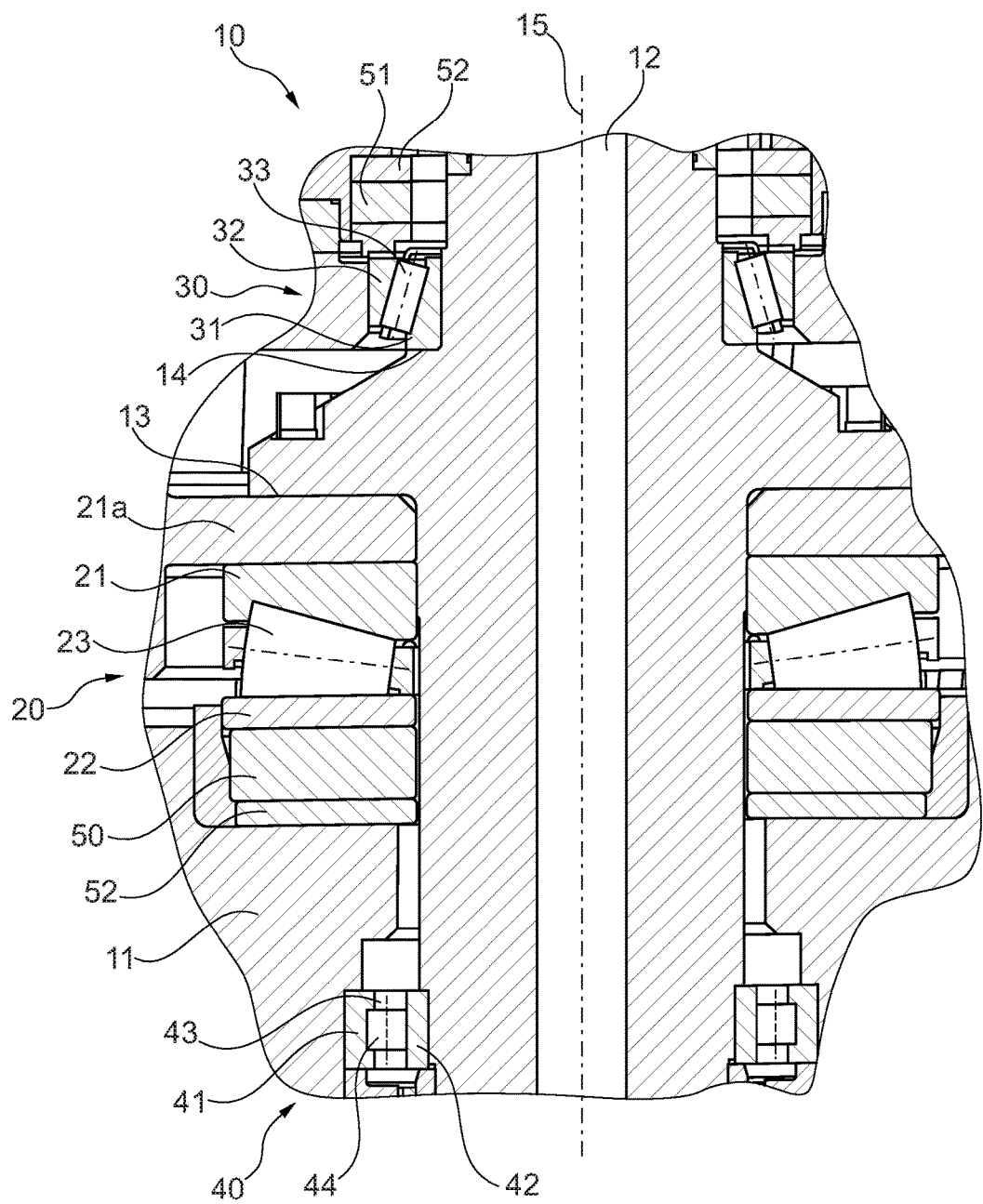
FIG. 1 is a diagram of a bearing arrangement with supported drive shaft according to a preferred embodiment of the present invention.

In FIG. 1 a bearing arrangement 10 according to the invention is illustrated. The bearing arrangement 10 is arranged in a housing 11 that can surround a supported drive shaft 12 in the region of the bearing arrangement 10 in axial direction of the drive shaft 12. The drive shaft 12 has an axis of rotation 15, around which the bearing arrangement 10 is designed. In the bearing arrangement 10 the drive shaft 12 can have a first bearing surface 13. By means of the first bearing surface 13 the drive shaft 12 can be in direct or indirect contact with a first contact surface 21a, or respectively with a first bearing ring 21 of a first axial bearing 20. The first axial bearing 20 can in particular be designed to take up a force acting on the drive shaft 12 and to counteract the force that acts during drilling in the direction of a weight force, thus in downward direction towards the ground. This force can in particular be the weight force of the drive shaft 12 as well as an external load on the shaft 12. Hence, during a drilling operation the first axial bearing 20 can carry a main load of the applied load exerted onto the drive shaft 12. During extraction the first axial bearing 20 can be provided to take up the weight force of the drill string and/or drill head.

The first axial bearing 20 can in particular be designed as a roller bearing having several rolling elements 23 arranged circumferentially around the drive shaft 12. These can be arranged between the first bearing ring 21 and the second bearing ring 22 of the first axial bearing 20. The axes of rotation of the rolling elements 23 of the first axial bearing 20 can in particular be arranged at an angle to the axis of rotation 15 of the drive shaft 12, which differs from a right angle. In particular, the first axial bearing 20 can be designed as a tapered roller bearing, the rolling elements 23 of which have a smaller diameter on a first side facing towards the drive shaft 12 as compared to a second side facing away from the drive shaft 12.

In particular, the axis of rotation of the rolling elements 23 of the first axial bearing 20 can confine an angle with the drive shaft 12, which is smaller than 90° above the axis of rotation of the rolling elements 23 and larger than 90° below the axis of the rolling elements 23. By preference, the contact region of the first axial bearing 20 with the second contact surface 22 is designed orthogonally with respect to the axis of rotation 15 of the drive shaft 12, i.e. horizontally.

Furthermore, in an upper region of the bearing arrangement 10 the drive shaft 12 can have a second bearing surface 14, through which the drive shaft 12 can be in contact with a first contact surface 31 of a second axial bearing 30. In particular, the second axial bearing 30 can be arranged between the first contact surface 31 and a second contact surface 32 of the second axial bearing 30, which can be designed as bearing rings in particular.

The second axial bearing 30 which can also be of cylindrical design is preferably designed at an angle to the drive shaft 12. More particularly, the angle of the axes of rotation of rolling elements 33 of the second axial bearing 30 can differ from a 90° angle with respect to the axis 15 of the drive shaft 12. By preference, the axes of rotation of the rolling elements 33 of the second axial bearing 30 are aligned in such a manner in the bearing arrangement 10 that the second axial bearing 30 is able to take up at least a radial force component that preferably acts through the drive shaft onto the first axial bearing 20. By particular preference, the axis of rotation of at least one rolling element 23 of the first axial bearing 20 is arranged orthogonally to an axis of rotation of at least one rolling element 33 of the second axial bearing 30.

Along their axis of rotation the rolling elements 33 of the second axial bearing 30 can have an upper end that can be formed with a smaller diameter and a lower end that can be formed with a larger diameter. The upper end of the rolling elements of the second axial bearing 30 can in particular have a smaller distance to the drive shaft 12 than the lower end. In particular, the first axial bearing 20 and the second axial bearing 30 can be designed as locating bearings.

At a lower end of the bearing arrangement 10 a radial bearing 40 can be arranged which can be disposed between a first contact surface 41 of the radial bearing 40 and a second contact surface 42 of the radial bearing 40. The contact surfaces 41, 42 of the radial bearing 40 can in particular be designed as bearing rings. The radial bearing can be designed both as roller and plain bearing, in particular allowing an axial movement of the drive shaft 12 along its axis of rotation 15.

If the radial bearing 40 is designed as a roller bearing, rolling elements 44 of the radial bearing 40 can be arranged along a guide 43 that enables a movement of the rolling elements 44 in the axial direction of the axis of rotation of the drive shaft 12, thus a bearing clearance. Therefore, the radial bearing 40 can in particular be designed as a non-locating bearing. Furthermore, the radial bearing can in particular be designed to take up a radial force component of the drive shaft 12 and to guide the drive shaft 12 radially.

The first axial bearing 20 and the second axial bearing 30 can be formed with a radial component, in which case the bearing arrangement can be formed with a prestressing.

In the region of the first axial bearing 20 a force measuring device 50 can be arranged. This is preferably provided below the first axial bearing 20. In the region of the second axial bearing 30 a second force measuring device 51 can be provided. Preferably, the second force measuring device 51 is arranged above the second axial bearing 30. The first force measuring device 50 and the second force measuring device 51 are connected to a computer unit, not depicted, which is designed to compensate a main load above the bearing arrangement 10, which acts in the direction of the weight force onto the drive shaft 12, compared to the main load below the bearing arrangement 10, which is actually present on the drive shaft 12.

To determine a temperature of the bearing arrangement 10 at least one temperature sensor 52 can be provided that can be arranged in the region of the first axial bearing 20 for example. Furthermore, a temperature sensor 52 can be arranged in a region above the second axial bearing 30 for example, wherein the at least one temperature sensor 52 is provided to determine the temperature of the bearing arrangement 10 and the drive shaft 12 respectively. To determine a temperature-dependent bearing tensioning the at least one temperature sensor 52 can be connected to the computer unit which takes the temperature determined on the bearing arrangement 10 or on the shaft in the region of the bearing arrangement 10 into account when compensating the load.

Figure 2:
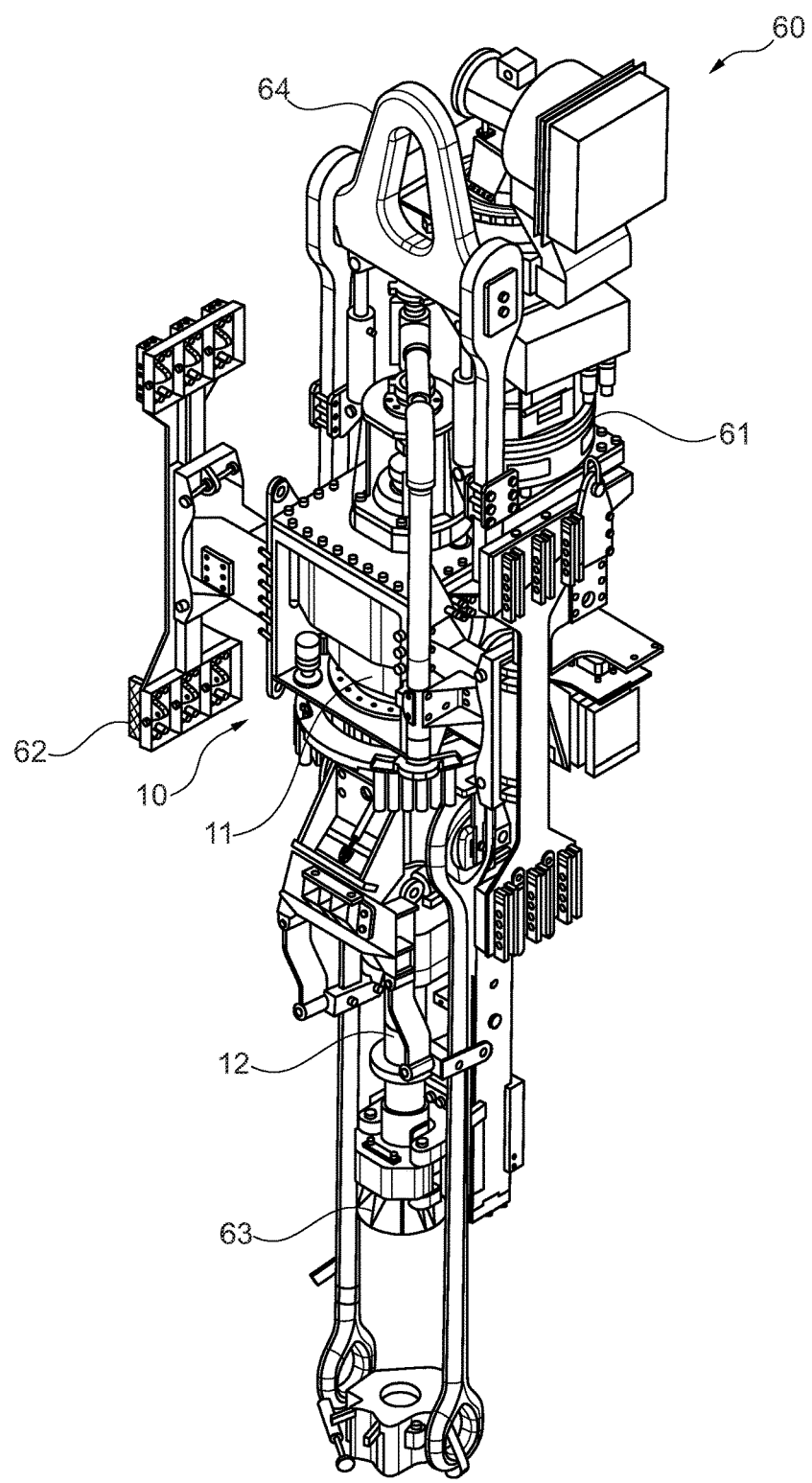
FIG. 2 is a perspective view of a drill drive with a bearing arrangement pursuant to the invention according to the preferred embodiment pursuant to FIG. 1.

In FIG. 2 a drill drive 60 is illustrated which has a bearing arrangement 10 according to the invention in the housing 11. To drive the drive shaft 12 provision is made for a motor 61 that can be provided at an upper end of the drill drive 60 above the bearing arrangement 10. The drive shaft 12 can in particular be driven electrically. As shown in FIG. 2, the drive shaft 12 protrudes at a lower end of the housing 11 from the bearing arrangement 10 and is designed to receive a drill string that preferably has a drill head. The drive shaft can also be designed to receive a drill flight or a different type of drilling tool. At a lower end of the drive shaft a suitable connecting device 63 is arranged. At least on two sides of the drill drive 60 a means 62 for guiding the drill drive, e.g. on a drill mast, can be arranged. By way of a suspension 64 located at an upper end of the drill drive, the said drill drive can be reliably delivered to the site of operation, wherein the drill drive, together with a drilling tool, as for example a drill string, can be pulled on the suspension 64 out of the borehole.

The invention claimed is:

1. Drill drive for a drilling rig, with a motor, by which a drive shaft is rotationally driven which is supported in a rotatable manner in a housing with a bearing arrangement having at least a radial bearing, a first axial bearing and a second axial bearing, wherein
   on the first axial bearing a first force measuring device is arranged for determining a first axial force on the first axial bearing and on the second axial bearing a second force measuring device is arranged for determining a second axial force on the second axial bearing,
   the first axial bearing is designed as a tapered roller bearing that carries an axial main load of the drive shaft,
   the radial bearing is arranged at a lower end of the drill drive in direction of a weight force acting on the drill drive and wherein the second axial bearing is arranged above the radial bearing in direction of the weight force acting on the drill drive,
   the radial bearing is designed as a cylindrical bearing and the second axial bearing as a tapered roller bearing,
   the radial bearing is designed as a non-locating bearing which is arranged in a movable manner parallel to an axis of rotation of the drive shaft,
   the first axial bearing is arranged between the radial bearing and the second axial bearing,
   the first force measuring device is arranged below the first axial bearing and the second force measuring device above the second axial bearing, and
   a computer unit is provided which is connected to the first force measuring device and the second force measuring device and designed to calculate an axial force that acts on the drive shaft below the bearing arrangement.

2. Drill drive according to claim 1,
   wherein the force measuring devices are arranged in a fixed manner and the computer unit is designed to compensate a load above the bearing arrangement, which acts in direction of the weight force and onto the drive shaft, compared to the load below the bearing arrangement, which is actually present on the drive shaft, in particular on the drill head.

3. Drill drive according to claim 2,
   wherein the first force measuring device is arranged between the radial bearing and the first axial bearing.

4. Drill drive according to claim 3,
   wherein on the drill drive at least one temperature sensor is arranged which is connected to the computer unit for determining a temperature-dependent bearing tensioning and designed to detect a temperature of the bearing arrangement.

5. Drilling rig, in particular for oil or gas drilling, with a drill mast, on which a drill string with a drilling tool is arranged, wherein on the drill mast a drill drive for rotationally driving the drill string is supported in a displaceable manner which is designed according to one of claims 1 and 2 to 4.

* * * * *